Jan. 19, 1960 L. S. SPRINKLE 2,921,422
EVACUATING AND SEALING MECHANISM
Filed June 4, 1954

INVENTOR
LLOYD S. SPRINKLE
his attorneys

United States Patent Office 2,921,422
Patented Jan. 19, 1960

2,921,422

EVACUATING AND SEALING MECHANISM

Lloyd S. Sprinkle, Brownsville, Pa.

Application June 4, 1954, Serial No. 434,466

8 Claims. (Cl. 53—80)

This invention relates to evacuating and sealing and particularly to a method and apparatus for evacuating and sealing hollow walled bodies. The mechanism of this invention is particularly adapted to the sealing of hollow walled vessels such as Dewar flasks, insulating panels, etc., made of plastics and resins, or having an evacuating insert made of such materials.

I provide an evacuating and sealing mechanism having evacuating means adapted to surround an opening into a hollow walled body in sealing engagement. A hollow feed line is provided into the evacuating means terminating adjacent the opening to be sealed. Feed means for introducing a thermally sensitive material into the feed line are provided. A piston is movable in the feed line to press the thermally sensitive material into the opening in the hollow walled body and heating means are provided on the piston fixing said thermally sensitive material in said opening. Preferably I provide a vacuum box having an opening in one side thereof provided with sealing means and adapted to engage the surface of a hollow walled body about an opening therein. A side arm is preferably provided on the feed line to introduce a measured charge of liquid thermosetting resin. An electrically heated polished head on the piston is provided to press the resin into the opening to be sealed and heat it to setting temperature.

The evacuating and sealing device of this invention can be combined in series or in parallel in a manifold arrangement whereby a number of hollow walled bodies can be evacuated and sealed simultaneously.

I have pointed out certain salient features of my invention in the foregoing statement however other features, objects and advantages will become apparent from a consideration of the following description and the accompanying drawings in which.

Figure 1:
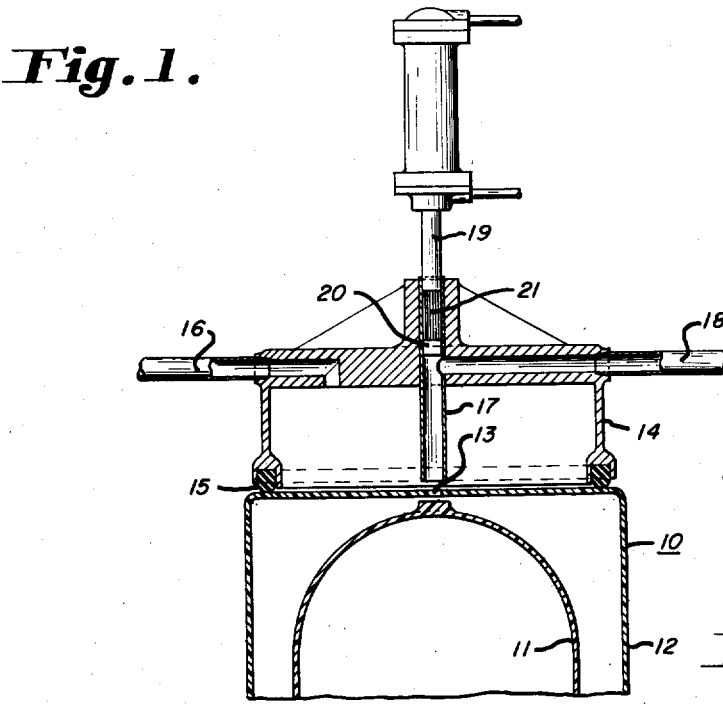
Figure 1 is a vertical section through an evacuating and sealing mechanism according to this invention.

Referring to the drawings I have illustrated a hollow walled body 10, in this instance a hollow walled bottle, having an inner shell 11 and an outer shell 12 spaced apart to form a hollow wall. An opening 13 is provided in the outer shell 12 at the bottom of the bottle. A vacuum box 14 having a resilient sealing strip 15 along the edges of an open side thereof is placed on the outer shell 12 surrounding the opening 13. The vacuum box is connected to a vacuum pump or other evacuating mechanism through line 16 in the side of the box. A hollow feed line 17 extends through the vacuum box to a point adjacent the opening 13. A resin feed line 18 connects to the hollow feed line 17. A piston 19 is reciprocable in the hollow feed line 17 by means of a double acting cylinder 19a and is provided with a polished heating tip 20 and electrical heating element 21.

Figure 4:
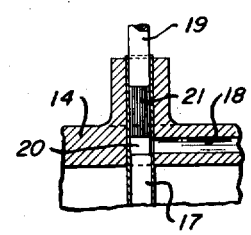
Figure 4 shows the feeding and sealing piston in normal position.

In operation a fixed and measured quantity of liquid thermosetting resin is discharged from the resin feed line 18 into the hollow feed line 17. The quantity of resin may be measured and fed by any of the well known liquid measuring feeders (not shown) or by timing the movement of piston 19 from the position shown in Figure 4 to that of Figure 1 and back again to the position of Figure 4. The piston 19 descends in the feed line 17 forcing the liquid resin into the opening 13 and on the surface of the shell 12. As the piston 19 forces the resin into place the heating element 21 heats the tip 20 which triggers the thermosetting reaction in the resin, causing it to set up and seal the opening in the shell 12. After the resin has set, the vacuum box is opened to the atmosphere, removed from the completely evacuated and sealed hollow body and transferred to another body to be evacuated and sealed.

Figure 2:
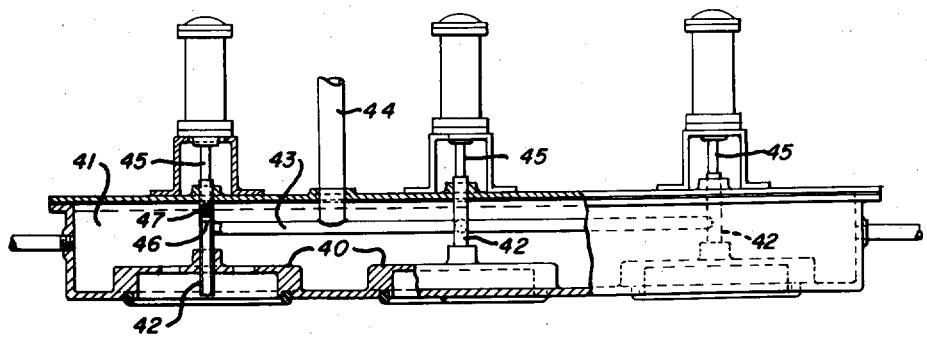
Figure 2 is a vertical section through a manifold arrangement using a multiplicity of evacuating and sealing mechanisms connected to a manifold.

As heretofore mentioned the device of this invention may be arranged in series or parallel and connected to manifolds whereby a large number of hollow walled bodies may be evacuated and sealed simultaneously. Referring to Figure 2 I have illustrated a plurality of vacuum boxes 40 connected to a vacuum manifold 41 whereby they may all be evacuated simultaneously. Each vacuum box 40 is provided with a hollow feed line 42 into which a resin feed line 43 fed from a manifold 44 is discharged. Each hollow feed line 42 is provided with a piston 45 identical with the piston 19 of Figure 1. A heating tip 46 and heating unit 47 are provided on each piston similar to the tip 20 and heating unit 21 of Figure 1.

Figure 3:
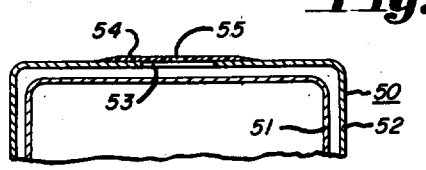
Figure 3 is a section through a modified type of hollow walled article.

The apparatus and method of this application can be applied to any hollow walled body having a plastic insert through which an evacuating opening can be placed or which will bond with plastics and resins as shown in Figure 3.

Referring to Figure 3 I have shown a hollow walled article 50 having an inner wall 51 and an outer wall 52. The outer wall is provided with an opening 53 over which a plastic insert 54 containing an opening 55 is bonded. Such an article is evacuated and sealed in the same manner as those illustrated in Figures 1 and 2. Liquid thermosetting resins are preferred, however, the apparatus is equally applicable to the setting and placing of powdered thermoplastic resins.

While I have illustrated and described certain presently preferred embodiments of my invention it will be understood that it may be otherwise embodied within the scope of the following claims.

I claim:

1. An evacuating and sealing mechanism comprising evacuating means adapted to surround an opening into a hollow walled body in sealing engagement, a hollow feed line in said evacuating means terminating adjacent the opening to be sealed, feed means introducing a flowable thermally sensitive material into said feed line, a piston movable in said feed line to meter and press the thermally sensitive material into the opening in the hollow walled body and heating means on the piston adapted to raise the temperature of the thermally sensitive material at the time it is placed in the opening and thereby fixing said thermally sensitive material in said opening.

2. An evacuating and sealing mechanism comprising a vacuum box adapted to surround an opening into the interior of a hollow walled body, evacuating means connected to said box, sealing means on said box sealingly engaging the surface of said hollow walled body, a hollow feed line in said box terminating adjacent the opening to be sealed and spaced from the connection to the evacuating means, feed means introducing a flowable thermosetting material into said feed line, a piston movable in said feed line to meter and press the thermosetting material into the opening in the hollow walled body and heating means on the piston raising the temperature of the thermosetting material at the time it is placed in the opening whereby to fix it in the opening.

3. An evacuating and sealing mechanism comprising a vacuum box having an opening in one side thereof adapted to surround an opening into the interior of a hollow walled body to be evacuated, sealing means around said opening in the vacuum box sealingly engaging the surface of the hollow walled body around the opening therein, evacuating means connected to said box, a hollow feed line in said box terminating adjacent the opening to be sealed and spaced from the connection to the evacuating means, feed means introducing a measured quantity of liquid thermosetting material into said feed line, a piston movable in said feed line to meter and press the thermosetting material into the opening in the hollow walled body and heating means on the piston raising the temperature of the thermosetting material at the time it is placed in the opening whereby to fix it in the opening.

4. An evacuating and sealing mechanism comprising a vacuum box adapted to surround an opening into the interior of a hollow walled body, evacuating means connected to said box, sealing means on said box sealingly engaging the surface of said hollow walled body, a hollow feed line in said box terminating adjacent the opening to be sealed and spaced from the connection to the evacuating means, feed means introducing a flowable thermoplastic material into said feed line, a piston movable in said feed line to meter and press the thermoplastic material into the opening in the hollow walled body and heating means on the piston raising the temperature of the thermoplastic material at the time it is placed in the opening whereby to fix it in the opening.

5. An evacuating and sealing mechanism comprising a vacuum box having an opening in one side thereof adapted to surround an opening into the interior of a hollow walled body to be evacuated, sealing means around said opening in the vacuum box sealingly engaging the surface of the hollow walled body around the opening therein, evacuating means connected to said box, a hollow feed line in said box terminating adjacent the opening to be sealed and spaced from the connection to the evacuating means, feed means introducing a measured quantity of liquid thermoplastic material into said feed line, a piston movable in said feed line to meter and press the thermoplastic material into the opening in the hollow walled body and heating means on the piston raising the temperature of the thermoplastic material at the time it is placed in the opening whereby to fix it in the opening.

6. An evacuating and sealing mechanism comprising a vacuum box adapted to surround an opening into the interior of a hollow walled body, evacuating means connected to said box, sealing means on said box sealingly engaging the surface of the hollow walled body, a hollow feed line in said box terminating adjacent the opening to be sealed and spaced from the connection to the evacuating means, feed means delivering flowable thermosetting material to said feed line, a piston movable in said feed line, means moving the piston to permit a measured quantity of thermosetting material to enter the feed line and then to press the thermosetting material into the opening in the hollow walled body, and heating means on the piston raising the temperature of the thermosetting material at the time it is placed in the opening whereby to fix it in the opening.

7. An evacuating and sealing mechanism comprising a vacuum box adapted to surround an opening into the interior of a hollow walled body, evacuating means connected to said box, sealing means on said box sealingly engaging the surface of the hollow walled body, a hollow feed line in said box terminating adjacent the opening to be sealed and spaced from the connection to the evacuating means, feed means delivering flowable thermoplastic material to said feed line, a piston movable in said feed line, means moving the piston to permit a measured quantity of thermoplastic material to enter the feed line and then to press the thermoplastic material into the opening in the hollow walled body, and heating means on the piston raising the temperature of the thermoplastic material at the time it is placed in the opening whereby to fix it in the opening.

8. An evacuating and sealing mechanism comprising a plurality of interconnected vacuum boxes, each adapted to surround an opening into the interior of a hollow walled body, a hollow feed line in each of said boxes terminating adjacent the opening to be sealed and spaced from the connection to the evacuating means, feed means introducing a flowable thermally sensitive material into said feed lines, a piston movable in each of said feed lines to meter and press the thermally sensitive material into the opening in the hollow walled body, and heating means on the piston adapted to raise the temperature of the thermally sensitive material at the time it is placed in the opening and thereby fixing said thermally sensitive material in said opening.

References Cited in the file of this patent

UNITED STATES PATENTS

| 234,674 | Ingersoll et al. | Nov. 23, 1880 |
| 241,264 | Woodbury | May 10, 1881 |
| 2,175,314 | Reynolds | Oct. 10, 1939 |
| 2,570,956 | Kronquest | Oct. 9, 1951 |
| 2,609,966 | Henry | Sept. 9, 1952 |
| 2,778,530 | Sillars | Jan. 22, 1957 |

FOREIGN PATENTS

| 249,825 | Italy | Aug. 18, 1926 |